US007158805B1

United States Patent
Park et al.

(10) Patent No.: US 7,158,805 B1
(45) Date of Patent: Jan. 2, 2007

(54) TELECOMMUNICATIONS SYSTEM AND TERMINAL APPARATUS FOR EXCHANGING TERMINAL STORED INFORMATION AND AUTOMATICALLY UPDATING CHANGED INFORMATION AMONG TERMINAL USERS

(75) Inventors: Hong-Jo Park, Seoul (KR); Mun-Ki Kim, Seoul (KR)

(73) Assignee: SmartINT Co., Ltd., Seoul (KR)

( * ) Notice: Subject to any disclaimer, the term of this patent is extended or adjusted under 35 U.S.C. 154(b) by 0 days.

(21) Appl. No.: 09/913,164

(22) PCT Filed: Feb. 10, 2000

(86) PCT No.: PCT/KR00/00101

§ 371 (c)(1),
(2), (4) Date: Jan. 25, 2002

(87) PCT Pub. No.: WO00/49821

PCT Pub. Date: Aug. 24, 2000

(30) Foreign Application Priority Data

Feb. 11, 1999  (KR) .................................. 1999-4815
Apr. 1, 1999   (KR) ................................ 1999/11420
Jul. 9, 1999   (KR) ................................ 1999/27771

(51) Int. Cl.
    H04Q 7/20  (2006.01)
(52) U.S. Cl. .................... 455/519; 455/414.1; 455/416
(58) Field of Classification Search ................ 455/518, 455/519, 566, 575.1, 527.1, 67.7, 414.1, 455/419, 420, 425; 380/247, 248, 249, 277, 380/278, 279, 282

See application file for complete search history.

(56) References Cited

U.S. PATENT DOCUMENTS 5,729,537 A * 3/1998 Billstrom .................... 370/329

(Continued)

Primary Examiner—Charles Appiah
Assistant Examiner—Joy Contee
(74) Attorney, Agent, or Firm—Nixon & Vanderhye P.C.

(57) ABSTRACT

A telecommunications terminal apparatus and a terminal-stored information updating system and method is disclosed for automatically distributing terminal-stored information and changes made in terminal-stored information among subscribing user's telecommunications terminals. Each telecommunications terminal apparatus includes a memory unit sufficient for storing information, pertaining to at least the subscribing user and one or more other telecommunications terminal apparatus users, such as: concise personal information, detailed personal information, a list of other parties that exchange information with the user, and key information indicative of a level of security or accessibility of information stored therein. Each telecommunications terminal belongs to a group of users handled by a telecommunications subscriber system. More than one subscriber system may be provided to handle multiple groups of users. Dedicated subscriber memory devices are provided within each telecommunications subscriber system for storing at least some of the data stored in corresponding subscribing user's telecommunications terminals. A data exchange management system is also provided which maintains a database of registered user's terminal-stored information and automatically receives and forwards to selected parties any updates or changes made to that information. In addition, changes to a user's terminal-stored information that are input on a registered user's terminal are automatically provided to the appropriate subscriber system and updated within the memory unit of all other user's terminals which have ever exchanged information with that registered user.

17 Claims, 2 Drawing Sheets

U.S. PATENT DOCUMENTS 5,974,312 A * 10/1999 Hayes et al. ................. 455/419
6,032,051 A * 2/2000 Hall et al. .................. 455/518
6,137,885 A * 10/2000 Totaro et al. ................ 380/247
6,298,228 B1 * 10/2001 Singh ......................... 455/403
2002/0068548 A1 * 6/2002 Schroderus et al. ......... 455/411

* cited by examiner

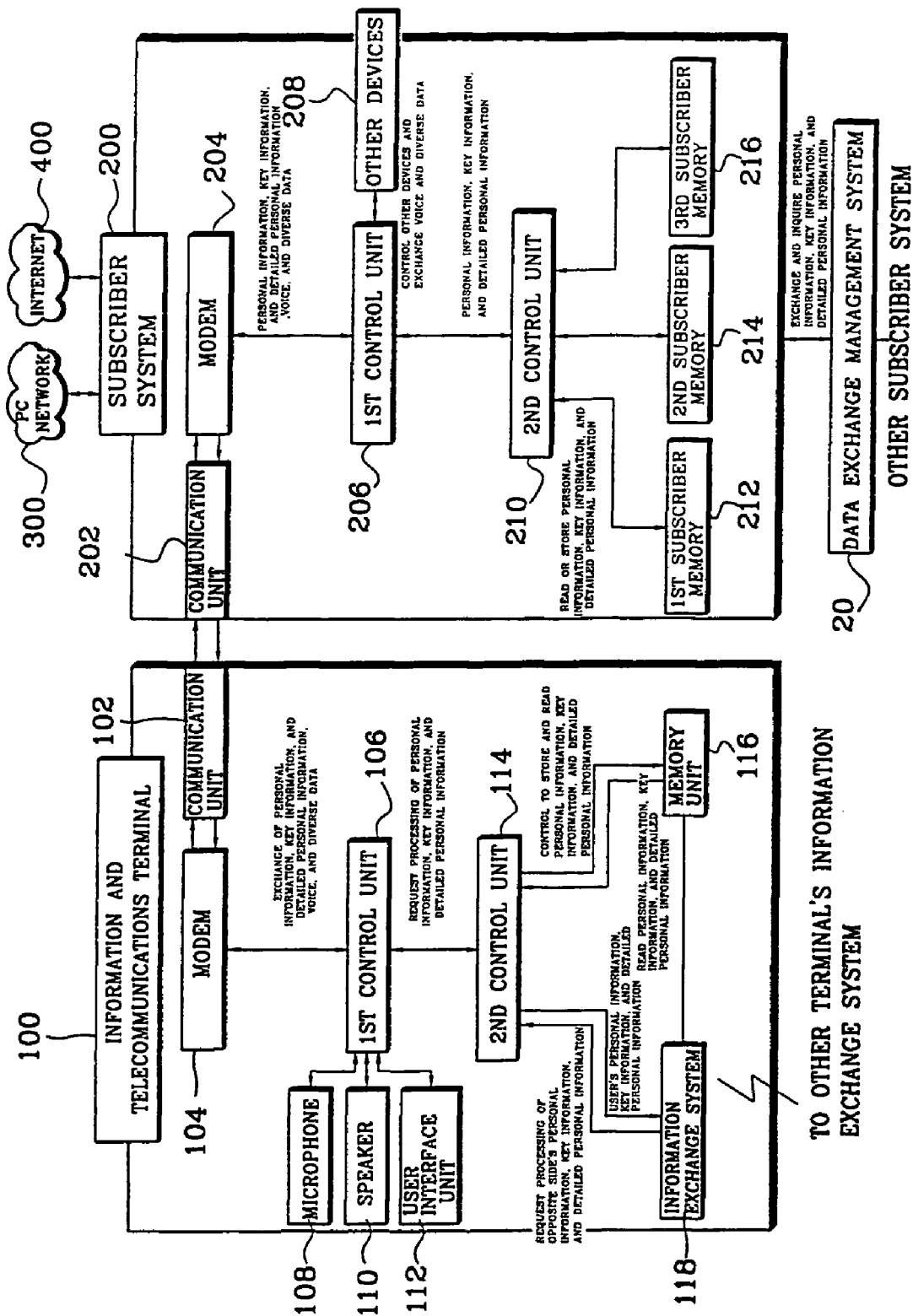

TELECOMMUNICATIONS SYSTEM AND TERMINAL APPARATUS FOR EXCHANGING TERMINAL STORED INFORMATION AND AUTOMATICALLY UPDATING CHANGED INFORMATION AMONG TERMINAL USERS

TECHNICAL FIELD

The present invention relates to a telecommunications service system, and more particularly, to a system for exchanging concise and detailed information among users in order to automatically update changed information in storage devices of all information and telecommunications terminals and of a subscriber system that exchanged information with a certain user, when changes occur in diverse information or key information related to the user, and an information and telecommunication terminal suitable for the system.

BACKGROUND ART

Telecommunications terminals, such as mobile phones and personal communication service (PCS) phones, electronic pocketbooks, portable computers, and desktop computers (hereinafter referred to as "user information and telecommunications terminals" or "telecommunications terminal apparatus") are widely used recently, and each can be used as an electronic business card book by inputting another party's personal information or exchanging personal information with the other party, through telecommunication media.

In the prior art systems, however, each party's data is simply exchanged and when a personal information change, for example, a phone number change, occurs later, the personal information can be updated only in the user's information and telecommunication terminal, and it is impossible to update the same data in other information and telecommunications terminals which exchanged information with the user's information and telecommunications terminal previously. Therefore, a user is inconvenienced with having to inform changed personal information, and the other users informed of the changed information have to manually input the changed information into their own information and telecommunications terminals. In particular, when a large number of opposite users previously exchanged information with the user, such informing and manual updating become very burdensome both to the user and opposite users.

DISCLOSURE OF THE INVENTION

An example non-limiting illustrative implementation of the system and method disclosed herein includes a system for exchanging information among users, and a system for automatically updating changed information in storage devices of all telecommunication terminals of a subscriber system that exchanged information with a particular user, when changes occur in diverse information or key information related to that particular user.

One aspect is to provide a system for exchanging concise and detailed information among users, the system for exchanging concise and detailed information, and key information with each other if a side requests the information when changes in those information are not input.

Another aspect is to provide an information and telecommunication terminal suitable for the system.

One example non-limiting illustrative implementation disclosed herein includes a system for exchanging concise and detailed information among users. The system includes a plurality of user information and telecommunications terminals each comprising a user memory unit for storing concise information or detailed information on a user and one or more other parties, key information to determine the access level of the information, and a list of all other parties that have ever exchanged information with the user; and a user control unit for controlling the sending of changes in the user's concise information, detailed information, or key information to all the opposite information and telecommunications terminals included in the list when the changes are input, and storing the other parties' concise information, detailed information, or key information in the user memory unit when the information are received, and a subscriber system comprising a plurality of system memory units for storing the user's concise information, detailed information, or key information for each of the plurality of user information and telecommunications terminals; and a system control unit for controlling changed concise information, detailed information, or key information sent from one of the plurality of information and telecommunications terminals to be stored in the system memory unit corresponding to the user, reading information stored in the system memory units based on the key information, and sending the information to information and telecommunications terminals of all other parties.

A further example illustrative implementation disclosed herein includes a system for exchanging concise and detailed information among users. The system includes a plurality of user information and telecommunications terminals each comprising a user memory unit for storing concise information or detailed information on a user and one or more other parties, key information to determine the access level of the information, and a list of all other parties that have ever exchanged information with the user; and a user control unit for controlling the sending of the user's concise information, detailed information, or key information to an opposite side information and telecommunications terminals when the opposite side requests information exchange, and storing concise information, detailed information, or key information received from the other parties in the user memory unit, and a subscriber system comprising a plurality of system memory units for storing the user's concise information, detailed information, or key information for each of the plurality of user information and telecommunications terminals; and a system control unit for controlling exchanged concise information, detailed information, or key information of the plurality of information and telecommunications terminals to be stored in each corresponding user's system memory unit.

A still further example illustrative implementation disclosed herein includes an information and telecommunications terminal. The information and telecommunications terminal includes a user memory unit for storing concise information or detailed information on a user and one or more other parties, key information to determine the access level of the information, and a list of all other parties that have ever exchanged information with the user, and a user control unit for controlling the sending of changes in the user's concise information, detailed information, or key information to all the other information and telecommunications terminals included in the list when the changes are input, and storing the other party's concise information, detailed information, or key information in the user memory unit when the information are received.

BRIEF DESCRIPTION OF THE DRAWINGS

These and other aspects and advantages of the disclosed exemplary non-limiting illustrative implementations will be better and more completely understood by referring to the following detailed description in conjunction with the attached drawings in which:

FIG. 2 illustrates the flow of signal processing between a group of subscriber systems shown in FIG. 1 and an information and telecommunications terminal registered with the system.

BEST MODE FOR CARRYING OUT THE INVENTION

Figure 1:
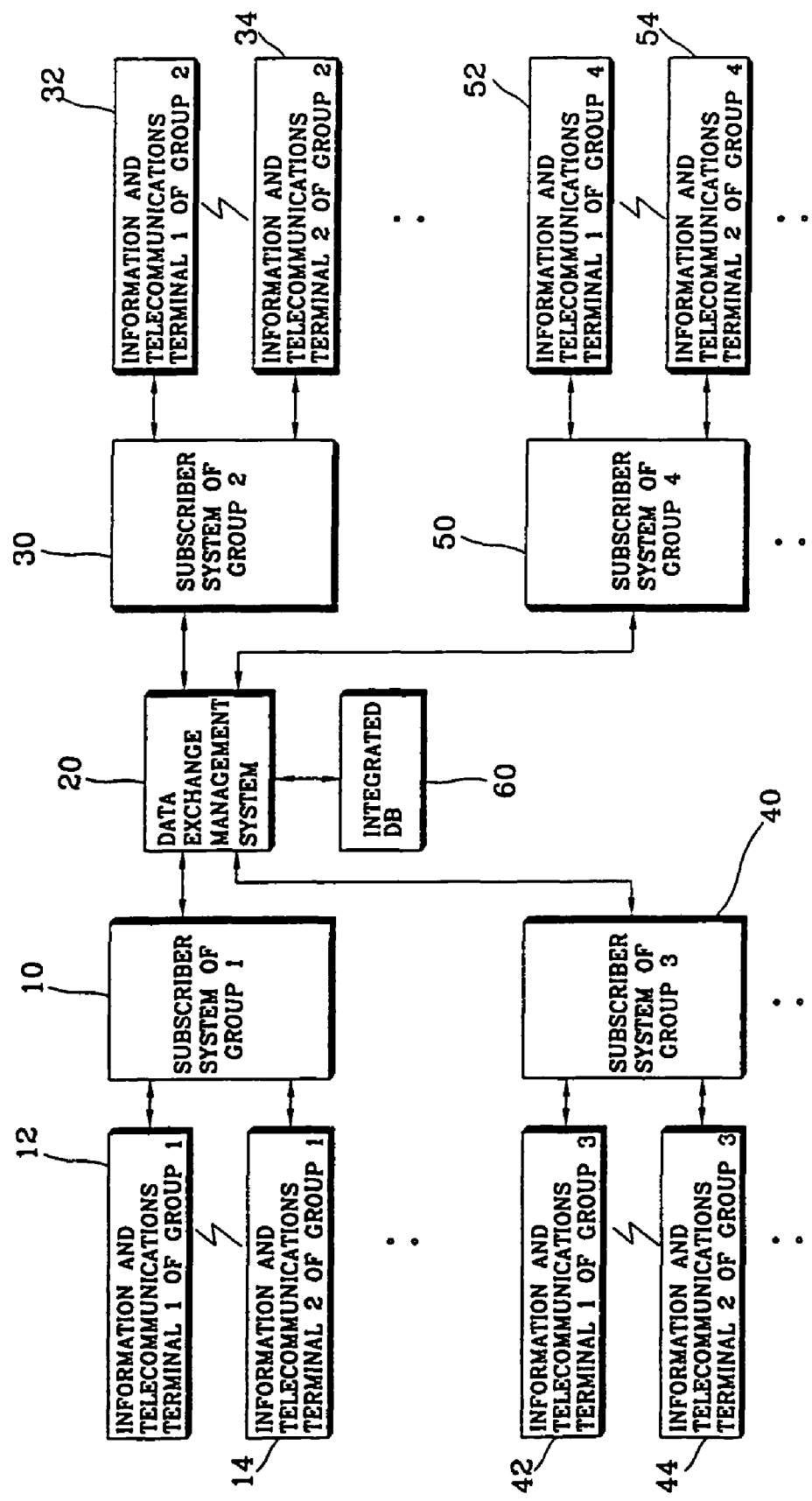
FIG. 1 is a block diagram of a system for exchanging concise and detailed information among users.

Hereinafter, non-limiting exemplary implementations will be described in detail with reference to the attached drawings. The present invention is not restricted to the following exemplary implementations, and many variations are possible within the spirit and scope of the present invention. The following non-limiting illustrative implementations are provided in order to more completely explain the present invention to anyone skilled in the art.

FIG. 1 is a block diagram of a system for exchanging concise and detailed information among users. In the system shown in FIG. 1, another party is an individual, and concise information is personal information.

Through a data exchange management system 20, the system shown in FIG. 1 automatically updates changed personal information detailed personal information, or key information in and among a plurality of user information and telecommunications terminals 12, 14, . . . , and 32, 34, . . . , which are connected to a plurality of subscriber system groups 10, 30, 40, 50, . . . .

In addition, without going through the data exchange management system 20, personal information, detailed personal information, or key information can be exchanged, when owners' of information and telecommunications terminals connected to the same groups or different groups of subscriber system meet together, through information exchange devices equipped in each terminal (to be explained later).

Each of the plurality of user information and telecommunications terminals 12, 14, . . . , and 32, 34, . . . , stores personal information or detailed personal information on the user thereof and on the users of one or more other terminals, and key information for determining the information access level, and a list of other terminals that previously exchanged key information with the user. When a user's personal information, detailed personal information, or key information changes, the changes are stored in the storage area of the user's information and telecommunications terminal and the subscriber system, and are sent to the storage areas of all other information and telecommunications terminals and subscriber systems included in the list. In addition, personal information, detailed personal information, or key information sent from the other information and telecommunications terminals to the user are stored in the storage area of the information and telecommunications terminal and the subscriber system. Also, when a user inputs changes through something other than the users terminal, for example, through a PC network or the Internet, the subscriber system to which the user belongs stores the changes in a corresponding memory, and at the same time, sends the changes to each terminal and system. Also, the changes are stored in the user's terminal.

Here, the personal information can include, for example, user name, e-mail address, telephone number of home or office, mobile phone number, birth date, or user's alma mater. The detailed personal information means a brief personal record, which is not included in the personal information, personal voice, or image, and moving picture which can be opened to friend-level persons, or detailed information related to a person's family. This can be regarded as a concise information of a user.

Meanwhile, key information is information used for inquiring about personal information and detailed personal information, and for this, information such as a phone number or some part of a phone number can be used, or a special key information can be defined. Key information has a key function for searching and authorizing an opposite party. That is, when a service subscriber with this key information requests opening or exchange of information, the data exchange management system 20 or the subscriber system determines the access level for obtaining personal information according to the key information. More specifically, when three key information, 1234, 4567, 8901, are set, key information 1234 can be set for opening some personal information, for example, opening e-mail and office phone number; key information 4567, can be set for opening all personal information; and key information 8901 can be set for opening a user's family information.

Each of a plurality of subscriber system groups 10, 30, 40, 50, . . . , store as many devices (a predetermined space for a user is assigned) as the number of subscribers registered to the corresponding system, and each of the storage devices stores both concise and detailed personal information and key information.

Changed personal information, detailed personal information, or key information, which is sent from any one of the plurality of information terminals, is stored in the corresponding subscriber memory in the system. It is also apparent that changed information, such as personal information input through another route, can be stored in the corresponding subscriber memory, and at the same time, sent with key information, not only to the terminal of the user who input the changed information, but also to the memories of all the terminals of those who have ever exchanged personal information, detailed personal information, or key information, with the user. When some other party who is designated to receive changed information, is a user of a different telecommunications subscriber system, the changed information is sent through data exchange management system 20, to that other party's subscriber system and terminal apparatus.

Meanwhile, an integrated database (DB) 60 is used to integrate information stored in subscriber memories, or information stored in the data exchange management system 20, shown in FIG. 1 to manage those information independently in a separate database. That is, without storing various data in subscriber memories or in the data exchange system 20, a database can be established with the separate integrated DB 60.

FIG. 2 illustrates the flow of signal processing between a subscriber system of a group shown in FIG. 1 and an information and telecommunications terminal registered to the system.

First, a case will now be described in which an information and telecommunications terminal 100 user (hereinafter, referred to as 'user A') inputs changes in personal information, etc., and then the terminals of others who previously exchanged key information, etc., with the user A are automatically updated with the changes.

When using a user interface unit 112 or microphone 108 and voice recognition, user A inputs changes in his/her personal information and other information, a 1st control unit 106 requests a 2nd control unit 114 to process the changes. Storing the changed information in a memory unit 116, the 2nd control unit 114 reads the changed information and the list of parties who exchanged key information with user A, and at the same time, requests the 1st control unit 106 to process the changed information and the list. The 1st control unit 106 passes the changed information together with the number of an information and telecommunications terminal 100 (the telephone number of the terminal and the unique manufacturing number of the terminal, that is, an electrical serial number, etc.) to a modulation/demodulation unit (modem) 104. The modem 104 converts the received information in the method that is applied to a communication unit 102. The communication unit 102 sends the converted signal to the subscriber system 200 to which the communication unit 102 belongs.

The signal received in the subscriber system 200 through the communication unit 202 is demodulated in a modem 204 and sent through a 1st control unit 206 to a 2nd control unit 210. The 1st control unit 206 controls the operation of all the other devices included in the system.

The subscriber system 200 has as many memory units 212, 214, and 216 as the number of registered information and telecommunications terminals. Each memory unit stores the personal information of each registered information and telecommunications terminal; information stored in the memory unit of each information and telecommunications terminal, information exchanged through the data exchange management unit 20, other information automatically exchanged through the information exchange devices equipped in each terminal, and information manually input through the Internet 400 or each terminal. Such information matches corresponding information and telecommunications terminal 1 to 1, and each information is separately protected, and information is opened only when a subscriber wants.

Using the terminal number sent from the information and telecommunications terminal 100, the 2nd control unit 210 finds the corresponding memory unit in the plurality of memory units 212, 214 and 216, and controls the storage of personal information, detailed personal information and key information. Then, when requested to open or exchange information through the data exchange management system 20, the 2nd control unit 210 determines according to the key information whether or not to open, update, or exchange, or the level of opening, according to the key information. In opening, updating, or exchanging, the 2nd control unit 210 reads information from the corresponding memory unit, and sends information to all the information and telecommunications terminals that exchanged information with user A's terminal, through the data exchange management system 20 so that an automatic update is performed. It is apparent that when the request of opening or exchanging information is from a subscriber within the same subscriber system, information does not need to go through the data exchange management system 20. Here, whether or not another party belongs to the same subscriber system can be checked through the telephone number appearing on the list of opposite (i.e., other user/party) terminals.

Here, a user interface unit 112 is used in inputting changed information, but, when user A does not have the information and telecommunications terminal, or when the terminal is not unable even though he brings the terminal, user A can input his changed information to the subscriber system 200 through another route, for example, a PC communication network or the Internet. At this time, the subscriber system 200 stores the changed information in the corresponding memory and at the same time, according to key information, reads and sends information to be opened to the user A's information and telecommunications terminal as well as to all opposite parties information and telecommunications terminals.

Here, when a normal voice or character message in addition to the personal information is input or output through the information and telecommunications terminal 100, the 1st control unit 106 control transmission and reception of, and input and output of various data through the user interface unit 112 which includes the microphone 108, or the speaker 110, and display units.

Meanwhile, a case will now be described in which a user B who exchanged key information with a user A inputs changes in his personal information and others through his information and telecommunications terminal, and then the changed information is automatically updated in the user A's information and telecommunications terminal.

When user B's terminal belongs to the same subscriber system 200 as user A's terminal, the changed information will be sent directly from the subscriber system 200, and when the user B's terminal belongs to the other subscriber system, updated information is sent through the data exchange management system 20.

At this time, when the updated information is sent from the communication unit 202 of the subscriber system 200 through the communication unit 102 of the information and telecommunications terminal 100, the modulation/demodulation unit 104 demodulates the updated information, and then sends it through the 1st control unit 106 to the 2nd control unit 114.

The 2nd control unit 114 stores the updated information of user B's in the memory unit 116. At this time, if the user B sends key information set at the minimum level of access, user A receives only that level of information.

In the meantime, the information and telecommunications terminal 100 can have an information exchange device (not shown). This enables a function for automatically exchanging personal information, detailed personal information, or key information stored in at least one user's terminal for personal information, detailed personal information, or key information stored in another terminal, when there are two or more owners of terminals (regardless of subscriber systems they belong to) which are set at an information exchange mode. It is clear that, for such an exchange, each of the terminals of the users that want to exchange information has to be equipped with an information exchange device, and when a certain user does not have a terminal equipped with the information exchange device, automatic exchange of information is impossible with the user. Here, there are various methods for exchanging information, including wired, wireless, and optical rays (infrared rays), sound (including supersonic waves). IC card and diverse secondary storage media.

So far, a function for automatically updating changed information in terminals of other parties who exchanged key information with a certain user when changes in the user's personal information and key information are input has been described.

However, a case can occur in which, by mistake or by intention, changed information is updated only in the subscriber system to which a user's terminal belongs. In order to cope with such cases, the system according to the present invention can periodically or randomly, check any changes in information on those who exchanged information with the system and are registered in another subscriber system, through the data exchange management system 20 so that the system according to the present invention can store changed information in its subscriber system and information and telecommunications terminal.

In addition, among those who exchanged key information with a user C, another user D who does not want changes in personal information to be known, for example, a star entertainer, may be present. Also, a case can occur in which a user sets, by mistake, changes in personal information not to be automatically updated. For example, when inputting changed information in his information and telecommunications terminal or in the Internet 400, a non-opening mode can be set so that changed information is input only in his information and telecommunications terminal.

At this time, since user D inputs changes only in his information and telecommunications terminal, automatic update cannot be performed but inquiry update can be performed. That is, the data exchange management system 20 is connected to user D's terminal, and then asks whether or not to open changed information to user C. Only when user D permits, user C can be informed of user D's changed information.

This inquiry update is also used for inquiries between those who have never exchanged personal information, detailed personal information, or key information.

For example. Kim Doe who works at "Seoul City Government" has once met Hong Doe who works at "Korea Telecom", but did not exchange personal information, detailed personal information, or key information when they met. In this case, using "Korea Telecom" and Hong Doe, Kim Doe can ask the data exchange management system 20 for an inquiry update on Hong Doe from his terminal. At this time, the data exchange management system 20 finds the system with which Hong Doe is registered, establishes a link to the terminal of Hong Doe, and then sends a message "Kim Doe of Seoul City Government is asking for your personal information. Give permission?" for communicating with Hong Doe. When Hong Doe permits the opening (it is apparent that the level of opening will be restricted by key information), Hong Doe's personal information, detailed personal information, or key information is stored in the subscriber system to which Kim Doe belongs, and in Kim Doe's terminal. It is apparent that, when Hong Doe does not permit it, Kim Doe cannot communicate with Hong Doe any more.

That is, according to the present system, minimum information on each other can establish a link between two persons. For example, when a part of Hong Doe's information exists in Kim Doe's database and some of Kim Doe's information exist in Hong Doe's database, the two database can be connected to each other according to the present system.

In the meantime, call processing can be performed efficiently and economically when a personal information exchange system according to the present invention is used. It is assumed that Kap Doe is going to make a phone call to UI Doe and Kap's information and telecommunications terminal is is a mobile phone.

Also following facts are assumed:

"UI Doe"'s personal information (the identification code on the data exchange management system is JASMINE):
1. hongkd@xxx.MAIL.COM
2. 02-xxx-8282
3. 019-xxx-2424
4. xx-dong, Kangdong-ku. Seoul
5. graduated from Seoul xx High School
6. the date of birth
7. others (to be continued)

"Kap Doe"'s personal information (the identification code on the data exchange management system is TIGER):
1.
2. 02-yy-yyyy
3.
4.
5. others (to be continued)

Kap Doe inputs "hongkd 3" as a keyword among UI Doe's personal information and pushes a send button, and then UI Doe's mobile phone is connected, or inputs "Kangdong-ku 3" and pushes a send button, then UI Doe's mobile phone is connected. It is apparent that other keywords can be used. Making a phone call using a shortcut-key is included in the existing telephone functions, but the present system is different in that an always-updated phone number is connected and key word use is not limited in a certain key word among character string keywords which are characteristic of an opposite party's personal information (hongkd, Kangdong-ku, and so on).

In addition, calling route can be selected by designation of a caller (Kap Doe). That is, when Kap Doe makes a phone call from his mobile phone to UI Doe's mobile phone (It is assumed that the two mobile phones are registered in different subscriber systems) and wants to establish links to Kap Doe's wired phone and mobile phone, Kap Doe inputs "hongkd 3 2" in his mobile phone and pushes the send button. Then, Kap Doe's call is sent through the subscriber system and data exchange management system 20 to a switch board (not shown) to which UI Doe is connected. The exchange establishes links to UI Doe's mobile phone and designated wired phone. By doing so, the charge for calling charge can be reduced.

In addition, the data exchange management system 20 can be made to automatically select calling routes according to pre-registration of a caller (for example, this can be offered as an additional service). For example, when Kap Doe, who subscribes to 019, calls UI Doe, who subscribes to 011, the data exchange management system 20 checks the line states of each of a plurality of mobile phone carriers, and establishes a link through the cheapest and best-quality lines.

Information items of the present system can be used by individuals as effective advertising tools when effectively used as in the following table 1

TABLE 1

| Item | Key Information | Name | Park Chul |
|---|---|---|---|
| Information item 1 | 1111 | One name -reference 1- | Smart |
| Information item 2 | 2222 | Phone (home) | 02-123-1234 |
| Information item 3 | 1111 | Phone (office) | 02-567-5678 |
| Information item 4 | 2222 | Fax (home) | 02-123-1235 |
| Information item 5 | 1111 | Fax (office) | 02-567-5679 |

TABLE 1-continued

| Item | Key Information | Name | | Park Chul | |
|---|---|---|---|---|---|
| Information item 6 | 1111 | Mobile phone (individual) | | 01X-232-1234 | |
| Information item 7 | 1111 | Pager (individual) | | 01X-234-2345 | |
| Information item 8 | 2222 | Emergency line 1 | | 02-967-0987 | |
| Information item 9 | 2222 | Emergency line 2 | | 01X-000-0000 | |
| Information item 10 | 1111 | Home page address | | http:www.person.com | |
| Information item 11 | 1111 | Email Address | | smart@person.com | |
| Information item 12 | 2222 | Address (home) | | Seocho-dong, Seocho-ku, Seoul | |
| Information item 13 | 1111 | Address (office) | | Seocho-dong, Seocho-ku, Seoul | |
| Information item 14 | 2222 | Advertising | Profile (Individual) | Graduated from YY - University in 19XX, majoring ZZ Marine, telecommunications branch<br>Two years of SI at Seoul Telecom. Also worked at High-speed Communication Division of the Ministry of the Information and Tele-communication, working at Korea System for three years | |
| Information item 15 | 1111 | | Working field | SI field:<br><br>1. Established ERP system for automobile parts company<br>2. Established Customer Billing System Mobile telecommunications field:<br><br>1. CDMA terminal S/W<br>2. Mobile Phone User Interface S/W<br>More details are available at my home page www.person.com | |
| Information item 16 | 2222 | | Personal greetings | I am a software engineer with experience in mobile tele-communications and SI. I am working on research and development for commercial-ization of related knowledge for the next-generation mobile communication IMT-2000. | |
| Information item 17 | 1111 | | Office greetings | The Korea System I am working for is the only Korean company that is developing core chips enabling high-speed multimedia data communications before commercialization of IMT-2000. | |
| Information item 16 | 2222 | | Moving picture | Storing data which show profiles and other data advertisements in the form of moving picture files | |
| Information item 19 | 2222 | | Voice data | Storing data which show profiles and other advertisements in the form of voice file | |
| Information item 20 | 1111 | Hobby | | climbing, photography, go | |
| Information item 21 | 1111 | Merits | | go, singing | |
| Information item 22 | 1111 | Interest | | Internet | |
| Information item 23 | 1111 | Others | | User Define Record Field | |
| Information item 24 | 1111 | Information Providing | sales | Daewoo Prince 1997, 3.5 million won, 24 months install-ment, discussion available | |
| | | | marriage | Call me, fantastic honeymoon tour information available. | |
| | | | lecture | "IMT-2000" seminar will be held in room 000 in YY University | |
| | | | others | Define information items on an individual that others request | |
| Information item 25 | 1111 | Bulletin Board | Park Chul | Marriage | place, time/ time/date/ month/year |
| | | | Kim Jooheon | Birthday Party | place, time/ time/date/ month/year |
| | | | 32th graduate | Alumni Party | place, time/ time/date/ month/year |
| | | | Other things an individual must inform others | | |

Information items 1 through 12 can be regarded as personal information (here, Park Chul's), and information items from information item 13 can be regarded as detailed personal information. The name field of the information item 1 represents "identification number on the data exchange management system". In table 1, key information are designated as "1111" and "2222", and this means that when key information of an opposite side who asks information exchange is "1111", then only the corresponding information items are exchanged, while when key information is "2222", then also only the corresponding information items are exchanged.

In addition, in the system according to the present invention, when the user or opposite side is legal entity, government organization, other related institutions (schools, military units, etc.), those information items can be used as efficient advertising tools.

TABLE 2

| Item | Key information | Name of legal entity (the name of government organizations, etc.) | | Seoul CITYLife Entertainment |
|---|---|---|---|---|
| Information item 1 | 1111 | One name -reference 1- | | CITYLife |
| Information item 2 | 1111 | Phone (rep.) | | 02-123-1234 |
| Information item 3 | 1111 | Phone (ext.) | | 02-567-5678 |
| Information item 4 | 1111 | Fax (rep.) | | 02-123-1235 |
| Information item 5 | 1111 | Fax (customer service room) | | 02-567-5679 |
| Information item 6 | 1111 | Mobile phone (rep.) | | 01X-123-1234 |
| Information item 7 | 1111 | Pager (rep.) | | 01X-234-2345 |
| Intormation item 8 | 1111 | Home page address | | http://www.CITYLife.com |
| Information item 9 | 1111 | E-mail address | | smart@CITYLife.com |
| Information item 10 | 1111 | Address | | Yeokaam-dong, Seocho-ku, Seoul |
| Information item 11 | 1111 | Advertisement 1 | Profile (legal entity) | Established in Jan. 1998 (paid-in capital 3 billion won) Producing and maintaining home page (having produced over 10,000 home pages) Web-hosting and domain registration (100,000 domains) Establishing branches in the U.S. and Canada, Jan. 1999 Selected as Quality Venture Company by the Ministry of the Information and Telecommunication |
| Information item 12 | 1111 | Working | field | Producing and maintaining home pages Web-hosting and domain registration Establishing local information network Consulting of small- and medium-business ERP solution Developing value-added services 01 communication networks More details can be available in home page www.CITYLife.com |
| Information item 13 | 1111 | Greetings | | The number of Internet shopping mall is exceeding 3 million now. In this situation, diverse solutions Seoul CITYLife Entertainment offers are necessary for companies. Please knock the door of "Seoul CITYLife Entertainment". |
| Information item 14 | 1111 | Moving | picture data | Storing data which show profiles and other advertisements in the form of moving picture files |
| Information item 15 | 1111 | Voice data | | Storing data which show profiles and other advertisements in the form of voice file |
| Information item 16 | 1111 | Advertisement 2 | 99's Hit products | Product name: hot&fast Web-hosting package, monthly charge: 50,000 won |
| Information item 17 | 1111 | | 99's New products | NEW infrared monitoring system |
| Information item 18 | 1111 | Others | | User define record field |
| Information item 19 | 1111 | Information providing | Stock | 15:30, Mar. 25, 1999. YY company, 100,000 won per share |
| | | | Fashion | Coco Chanel Show at KOEX, 15:00, Mar. 27, 1999 |
| | | | Weather | Sunny after cloudy |
| | | | Others | Customized information |
| Information item 20 | 1111 | Buttetin Board | | Notice of moving: planning to move from Kangnam area to Chongro area Jan. 1, 1999 |

TABLE 2-continued

| Item | Key information | Name of legal entity (the name of government organizations, etc.) | Seoul CITYLife Entertainment |
|---|---|---|---|
| | | | Winner of 25 CITYLife Quiz will be announced at www.CityLife.com Other information to be informed to customer |

In "reference 1" of tables 1 and 2, the name field of information item 1 represents "the identification number on the data exchange management system". The bulletin board field of information item 25 of table 1 and that of information item 20 of table 2 informs the general public of necessary notices. Here, the public means those who have ever exchanged information with the user (the individual user "Park Chul" or a legal entity user such as "Seoul CITYLife Entertainment").

The information providing field of information item 24 of table 1 and that of information item 19 of table 2 enables the individual user "Park Chul" or the legal entity user "Seoul CITYLife Entertainment" to send processed information to those who want the information, separately from the bulletin board item.

In addition, though not included in the tables 1 and 2, "car number & car registration number" of a user's car can be included as an information item. For example, a car (car number Seoul 51 Ma 7788) of the individual user "Park Chul" or the legal entity user "Seoul CITYLife Entertainment" is parked, without leaving any memo of telephone number, in front of a car of Kap Doe. Kap Doe can establish a link to a plurality of communication terminals of the car owner by inputting the car number "7788".

Meanwhile, the information items in the tables are examples for explanation, and communication service providers that use the items can optimize the items through modification so that users feel friendliness. In addition, the information providing item and the bulletin board item can be subdivided as needed.

Also, in the system according to the present invention, an individual user can access the Internet by inputting a home page address in his information and telecommunications terminal, and when accessing the Internet, the user can get concise and detailed information of individuals and companies that operate home pages, and at the same time, sends his own personal information and detailed personal information. By doing so, information can be exchanged. In addition, when among exchanged information, the address of a home page is changed later, individuals and companies can be informed of the changes by the information exchange system according to the present invention.

Also, the system according to the present invention enables a letter to be sent safely even when e-mail of the opposite side is not effective. That is, when a user sends an e-mail such as bills, notices, or invitation cards, and the e-mail system of the opposite side is not effective, then the mail can be printed and sent again thanks to a link to a management system of a post office. Therefore, the system according to the present invention enables a user to communicate with an opposite party through any changed information item when the user accesses the opposite party through any information item.

In the meantime, services can be provided by storing unique or identifying numbers of any goods or commodities (i.e., a car, a TV, an audio system, a video system, a refrigerator, a computer and peripherals, a printer, a scanner, a credit card, a bankbook, a gas station customer card, books, a record, a magazine, a newspaper), a road sign, and advertising media (i.e., a sign board, a TV or radio program, a movie, a video, a record, a newspaper advertisement, news on newspapers)

The subscriber system stores model names, telephone numbers of manufacturers or sales companies, personal information of each user each corresponding to the unique numbers. Therefore, for example, when a user finds his product out of order, he can input the unique number of the product in his information and telecommunications terminal (a computer, a portable computer, a mobile phone, a bi-directional pager, a telephone, or PDA), send the number to the subscriber system. Then the subscriber system returns product information corresponding to the unique number to the user. Otherwise, the subscriber system sends the user's personal information to the corresponding manufacturer or sales company, or establishes a direct link between the user and the manufacturer or sales company. Then, when the user's personal information changes, the changes are automatically sent to the manufacturer or sales company corresponding to the unique number. Also, an order for purchasing and approval of products and services is sent to the manufacturer and the sales company, and all information related to purchasing, for example, current processing state, price, shops, purchasing date, delivery state, completion of delivery, and delivery date, are sent to the user's information and telecommunications terminal, the subscriber system, and the data exchange management system. Therefore, the user can receive the latest information on products and after-sales-services, buy products, and receive all information related to the product after purchasing.

In addition, in the above case, when a CPU attached to the product, for example, a car or a consumer electronics product, informs the subscriber system of whether or not the product is operating normally, through communication tools such as a mobile phone, a wired phone, a computer modem, PC communication, and the Internet, the subscriber system establishes a link to the manufacturer, sales company, or service-providing company of the car or the consumer electronic product, so that remote diagnosis, or remote after-sales service can be performed. Here, the interface between the communication tools and the CPU includes optical rays including infrared rays, wireless tools, supersonic media, and for the car's case, the interface includes using the power supply terminal of the cigarette lighter socket as a communication terminal, or adding a new communication terminal in the cigarette lighter socket.

For example, when a user carrying an information and telecommunications terminals gets into the car or an information and telecommunications terminal is in the car, a variety of data on speed, location, break state, engine state, and other states of the car's operation are sent to the information and telecommunications terminal. Then, the information and telecommunications terminal sends the information to the subscriber system, and the subscriber system supplies the information an automobile company, or a traffic control center that needs the data. Such data are immediately supplied to a driver, a billing place of a toll road, an after-sales-service center, a gas station, a tow truck, the police, and the necessary steps are automatically performed.

All functions of the present invention described above can be implemented by adding the functions to a browser function which enables the current personal information and telecommunications terminal to access the Internet. Also, the detailed personal information includes personal information management items such as personal schedule management and work plans, and security information items such as various secret numbers.

In addition, in the detailed information item of the present invention, which is not shown in the drawings, information items to supply user's mood, appearance, emotions, etc., predetermined presents or action, anything related to amiableness index after setting the index, diverse natural environments or quiz can be included. When such items change, the changes are sent and stored in the subscriber system and the data exchange management system and also sent to the other information and telecommunications terminals, similarly to the update of the personal information or detailed personal information.

At this time, in order to effectively express the information items, a variety of media, for example, pictures, photos, moving pictures, animation, music and other sound as well as text (hereinafter referred to as 'state data') can be used.

To put it more concretely, a user can set his mood, look, or emotion and send it to the opposite side, and whenever it is updated, the opposite side terminal is also updated.

In addition, a user can select one or more other parties on the information and telecommunications terminal to give presents, or to supply games, education, meals, remedies, cleaning, consulting, etc., or, when a user sets diverse actions such as nursing, the action can be supplied to the opposite side.

In the meantime, when a user sets an amiableness index of the other party, the amiableness with the opposite side is expressed as various state data on graphic icons according to the index of the amiableness. For example, when a user sets high index for the opposite side A and low index for the opposite side B, the relationship with A is represented close on the graphic icon, while that with B is represented relatively far on the graphic icon.

In addition, a user can set natural environment such as rain, snow, sun, and moon, for current weather or certain situation, and sends them to other parties by state data.

As for quiz, those quizzes which a user obtained through any route can be supplied to other information and telecommunications terminals.

For example, a user can download quizzes in the form of text, pictures, photos, moving pictures, animation, music, and other sounds, from the data exchange management system and send them to the information and telecommunications terminals of other users. The other users solve the quizzes and send the answers back to the user who sent the quizzes, the subscriber system, or the data exchange management system, and then, after their answers are scored, receive the results.

The present invention is not limited to the embodiments described above, and modification is possible by those skilled in the art within the idea of the present invention. For example, using personal information, detailed personal information, or key information databases established by the present invention, various application system can be established. In the meantime, the system according to the present invention can exchange information when a user or another party requests such an exchange, even when personal information, detailed personal information, or key information of a user or an opposite side does not change.

Therefore, the scope of claims on the present invention is not limited by the embodiments but by the following claims.

INDUSTRIAL APPLICABILITY

According to the present invention, when a user's personal information changes by only inputting the changes in his terminal, databases of all parties who have ever exchanged information with the user are automatically updated. In addition, through the system according to the present invention, information items can be used as efficient advertising tools for individual persons, legal entities, government organizations, and other related institutions (schools, military units, etc.).

In addition, information on users can be mutually exchanged through the Internet, and even when e-mail of the opposite side is not effective, e-mail such as bills or notices can be sent again thanks to a link to a post office.

In addition, by selecting a calling route according to a caller's designation, or by a system's automatic selection of a calling route based on a caller's prior in-advance registration of the route, the most economical and best quality communication lines can be selected depending on calling place and time, and prior selection information on communication lines from the system can be offered.

When unique numbers of any goods or commodities, a road sign, and advertising media are being stored in the subscriber system and a user finds his product out of order, he can input the unique number of the product in his information and telecommunications terminal, and sends the number to the subscriber system. Then, related information is sent to the user, and the user can receive the latest information on the product, after-sales-services, and continuous maintenance service such as exchange of parts and components. At the same time, an order for purchasing and approval of products and services is sent to the manufacturer and the sales company, and all information related to purchasing is sent to the user. Therefore, the user can receive all information on products during purchasing and after purchasing.

What is claimed is:

1. A system for exchanging and automatically updating changes in terminal-stored information among users having a telecommunications terminal apparatus, the system comprising:

a plurality of user telecommunications terminal apparatus each comprising:

a user memory unit having at least personal information and detailed personal information stored therein concerning a terminal user and one or more other parties having a telecommunications terminal apparatus, key information indicative of a preassigned level of accessibility associated with terminal-stored information, and a list of other parties that have exchanged information with said terminal user; and a control unit for:

controlling a forwarding of changes made to a terminal user's stored information or key information to other telecommunications terminals included in the list of other parties whenever said changes are input by said user, and storing an other party's terminal stored information and key information in the user memory unit whenever that information is received; from said other party and a telecommunications subscriber system comprising one or more system subscriber memory units for storing a plurality of user's terminal stored information and key information corresponding to a plurality of subscriber telecommunications terminals, and a subscriber system control unit for:

controlling storage of changed user terminal stored information and key information received from one of the plurality of subscriber telecommunications terminals based for storage in one or more subscriber system memory units based on a corresponding subscribing user's key information, and sending the changed information to all terminal apparatus of said other parties;

wherein the system for exchanging and automatically updating changes in terminal stored information among users further comprises:

one or more other subscriber systems;

a plurality of registered user telecommunications terminal apparatus belonging to a subscriber system; and a data exchange management system for:

receiving changed terminal stored information, and key information from one or more registered telecommunications terminal apparatus, and sending changed information to other registered telecommunications terminal apparatus in one or more subscriber systems based on said key information of a corresponding registered terminal apparatus from which the changed information is received.

2. The system of claim 1 wherein said terminal stored information comprises concise information, detailed information and key information, and wherein even if changes in a user's concise information, detailed information and key information are not input into a registered telecommunications terminal apparatus, the concise information, detailed information, or key information is exchanged between parties when another registered party requests a subscriber system to provide such information.

3. The system of claim 1 wherein a terminal apparatus user or other subscribing party may comprise an individual, a legal entity, a governmental organization, a school, a military unit, or other organization.

4. The system of claim 1 wherein the data exchange management system further comprises a database for storing IDs which may be used to uniquely specify each of a plurality of users registered in one or more subscriber systems, and telephone numbers, each corresponding to the IDs, wherein when a user of any one of said registered terminal apparatus in a subscriber system makes a call to another party registered in another subscriber system using only an ID of said another party, the subscriber system of said another party is linked based on a telephone number corresponding to said ID stored in the database.

5. The system of claim 1, wherein the data exchange management system enables a terminal apparatus user to select a calling route when a call is made between telecommunications terminal apparatus of two users.

6. The system of claim 1, wherein the data exchange management system selects a preferred calling route to be selected according to the based on a prior registration of a caller when a call is linked between telecommunications terminal apparatus of two users.

7. The system of claim 2, wherein the data exchange management system includes a database storage and periodically or randomly checks a database corresponding to a subscriber's telecommunications terminal apparatus that is registered in another subscriber system in response to a subscribing user's update request, and when changes in concise information, detailed information, or key information occur, the data exchange management system stores the changes made to information stored in the subscriber memory of the user's subscriber system and also stores the memory unit contents of the corresponding user's telecommunications terminal apparatus in said database storage.

8. The system of claim 2, wherein the telecommunications terminal apparatus further comprises an information exchange device for or more users allowing an automatic exchange of concise information, detailed information, or key information that is stored in the memory unit of a terminal apparatus directly between any two terminal apparatus when an information exchange mode is set within each terminal apparatus.

9. The system of claim 1, wherein the data exchange management system further comprises an integrated database for storing data maintained in the memory unit of each registered terminal apparatus and/or in subscriber memory units of one or more subscriber systems.

10. A system for exchanging concise and detailed information among users, the system comprising:

a plurality of user information and telecommunications terminals each comprising a user memory unit for storing concise information or detailed personal information on a user and one or more other parties, key information to determine the access level of the information, and a list of all other parties that have ever exchanged information with the user; and a user control unit for controlling the sending of changes in the user's concise information, detailed information, or key information to all other information and telecommunications terminals included in the list when the changes are input, and storing the other party's concise information, detailed information, or key information in the user memory unit when the information are received; and a subscriber system comprising a plurality of system memory units which store a user's concise information, detailed personal information, or key information for each of the plurality of user information and telecommunications terminals; and a system control unit for controlling changed concise information, detailed personal information, or key information sent from one of the plurality of information and telecommunications terminals to be stored in the system memory unit corresponding to the user reading information stored in the system memory units based on the key information, and sending the information to information and telecommunications terminals of all other parties;

wherein the subscriber system stores one or more of the following information items:

identifying numbers of goods, commodities, a road sign, and advertising media located close to a user, and product model names, telephone numbers of manufacturers, sales companies, advertising companies, or service providing companies corresponding to said identifying numbers in each corresponding user's personal information, or detailed personal information; and said subscriber system automatically sends information related to said identifying numbers to a user's information and telecommunications terminal, or sends user personal informal or detailed personal information to manufacturers, sales companies, advertising companies, or service providing companies whenever the subscriber system receives said identifying numbers from the user's telecommunications terminal apparatus.

11. A system for exchanging concise and detailed information among users, the system comprising:

a plurality of user information and telecommunications terminals each comprising a user memory unit for storing concise information or detailed personal information on a user and one or more other parties, key information to determine the access level of the information, and a list of all other parties that have ever exchanged information with the user; and a user control unit for controlling the sending of changes in the user's concise information, detailed information, or key information to all other information and telecommunications terminals included in the list when the changes are input, and storing the other party's concise information, detailed information, or key information in the user memory unit when the information are received; and a subscriber system comprising a plurality of system memory units which store a user's concise information, detailed personal information, or key information for each of the plurality of user information and telecommunications terminals; and a system control unit for controlling changed concise information, detailed personal information, or key information sent from one of the plurality of information and telecommunications terminals to be stored in the system memory unit corresponding to the user reading information stored in the system memory units based on the key information, and sending the information to information and telecommunications terminals of all other parties;

wherein the user's concise information includes at least one or more of the following information items:

an identification number, a telephone number, a facsimile number, a mobile phone number, a pager number, a home page address, an e-mail address, a home address, and an office address; and the user's detailed information includes at least one or more of the following information items:

a profile, a working field, greeting, a moving picture or a voice data for introducing the user, a user hobbies, user merits, user interests, a user diverse information item, a bulletin board, or one or more information items used for expressing a user's mood, look, emotion, or information related to certain gifts or actions, or information for expressing an index of amiableness with another party, or information on various natural environment, or information on user quizzes.

12. The system for exchanging concise and detailed information among users of claim 10, wherein when the user's personal information, or detailed personal information changes, the changed information is sent to the manufacturers, sales companies, advertising companies, or service providing companies.

13. The system for exchanging concise and detailed information among users of claim 10, wherein when the goods or commodities are cars or consumer electronic products that have an internally attached CPU, and if the CPU sends information on whether or not a product is out of order through a communication tool using one or more of infrared rays, light rays, radio waves, and supersonic to the user's information and telecommunications terminal, the information and telecommunications terminal sends the information to the subscriber system and then the subscriber system sends the information to the manufacturer sales company, or service providing company so that remote diagnosis and remote after sales service for the product is enabled.

14. The system for exchanging concise and detailed information among users of claim 13, wherein the interface between the attached CPU and the information and telecommunications terminal in the car's case, a power supply terminal of a cigarette lighter socked can be used as a wired communication terminal, or an additional communication terminal is added to the cigarette lighter socket.

15. The system for exchanging concise and detailed information among users of claim 14, wherein when the car's CPU sends diverse data on speed, location, break state, engine state, and other states of the car's operation to the user information and telecommunications terminal through the interface, and then the terminal provides the subscriber system sends the information to an automobile company, or traffic control center that needs the information, so that a driver, a billing place of a toll road, an after-sales service center, a gas station, a tow truck company, or the police can carry out necessary steps.

16. The system for exchanging concise and detailed information among users of claim 11, wherein after a user downloads quizzes in the form of state data from the data exchange management system and sends these to the information and telecommunications terminals of other users, the other users solves the quizzes and re-send the answers to the user who sent the quizzes, the subscriber system, or the data exchange management system, and the, after the answers are scored, the other users receive the result.

17. The system for exchanging concise and detailed information among users of claim 10, wherein when the user information and telecommunications terminal sends an order for purchasing and approval of products and services to the manufacturer and the sales company, the sales company sends diverse information necessary for purchasing including one or more information among current processing state, price, shops, purchasing date, delivery state, completion of delivery, delivery date, to the user's information and telecommunications terminal through the subscriber system or the data exchange management system.

* * * * *